United States Patent
Rahman

(10) Patent No.: US 9,641,900 B2
(45) Date of Patent: May 2, 2017

(54) CHANNEL CHANGE VIA AN ALTERNATE MULTIMEDIA CONTENT DELIVERY SYSTEM

(75) Inventor: Moshiur Rahman, Marlboro, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 734 days.

(21) Appl. No.: 12/637,623

(22) Filed: Dec. 14, 2009

(65) Prior Publication Data

US 2011/0145869 A1 Jun. 16, 2011

(51) Int. Cl.
| | |
|---|---|
| H04N 21/482 | (2011.01) |
| H04N 21/438 | (2011.01) |
| H04N 21/462 | (2011.01) |
| H04N 21/488 | (2011.01) |
| H04N 21/61 | (2011.01) |
| H04N 21/6332 | (2011.01) |
| H04L 29/06 | (2006.01) |

(52) U.S. Cl.
CPC ....... *H04N 21/482* (2013.01); *H04L 65/4076* (2013.01); *H04L 65/4084* (2013.01); *H04L 65/80* (2013.01); *H04N 21/4383* (2013.01); *H04N 21/4622* (2013.01); *H04N 21/4882* (2013.01); *H04N 21/6125* (2013.01); *H04N 21/6332* (2013.01)

(58) Field of Classification Search
CPC ........... H04N 21/4383; H04N 21/4622; H04N 21/482; H04N 21/4882; H04N 21/6125; H04N 21/6332; H04L 65/4076; H04L 65/4084; H04L 65/80
USPC .................................................... 725/95, 98
See application file for complete search history.

(56) References Cited

U.S. PATENT DOCUMENTS

| | | | |
|---|---|---|---|
| 7,340,759 B1* | 3/2008 | Rodriguez | 725/8 |
| 2003/0121047 A1* | 6/2003 | Watson et al. | 725/93 |
| 2006/0218604 A1* | 9/2006 | Riedl et al. | 725/91 |
| 2007/0130393 A1 | 6/2007 | Versteeg | |
| 2007/0157234 A1* | 7/2007 | Walker | 725/38 |
| 2008/0092199 A1* | 4/2008 | McCarthy et al. | 725/133 |
| 2009/0031392 A1 | 1/2009 | VerSteeg et al. | |
| 2009/0116379 A1* | 5/2009 | Rahman | 370/229 |

(Continued)

OTHER PUBLICATIONS

"ISMA Addresses Fast RTP Channel Change for IPTV," TVover.net, posted on Oct. 25, 2006, 3 pages. <http://www.tvover.net/2006/10/25/ISMA+Addresses+Fast+RTP+Channel+Change+For+IPTV.aspx>.

(Continued)

*Primary Examiner* — Chenea Smith
(74) *Attorney, Agent, or Firm* — Toler Law Group, PC

(57) ABSTRACT

Methods and systems are disclosed to perform a channel change via an alternate multimedia content delivery system. A particular method includes detecting a request to perform a channel change at a customer premise equipment (CPE) device. The method also includes sending the request to a server of a primary multimedia content delivery system that supports delivery of content to the CPE device. The method further includes receiving a bandwidth limitation message from the server. The method includes generating a notification for display at a display device coupled to the CPE device. The notification prompts a user with respect to delivery of content over one or more alternate multimedia content delivery systems in response to the requested channel change.

20 Claims, 6 Drawing Sheets

(56) References Cited

U.S. PATENT DOCUMENTS

2009/0119736 A1* 5/2009 Perlman et al. ............. 725/133
2010/0095335 A1* 4/2010 Wilson et al. .............. 725/105

OTHER PUBLICATIONS

Hallam, et al., "Video Transport and Distribution for IPTV Networks", Tellabs, published Oct. 2006.
"Quantifying the Financial Benefits of Cisco Visual Quality Experience: Preserve the IPTV Experience", Cisco; Retrieved: Nov. 10, 2009. <http://www.ciscosystems.org.ro/en/US/prod/collateral/routers/ps9853/white_paper_c11-5c11-543900_ns724_Networking_Solutions_White_Paper.html>.
Valdes, Robert. "How Broadband Over Powerlines Works", HowStufWVorks, 2 pages; Retrieved: Nov. 11, 2009. <http://computer.howstuffworks.com/bpl5.htm>.
"Power line communication", Wikipedia, the free encyclopedia, 10 pages; Retrieved: Nov. 11, 2009. <http://en.wikipedia.org/wiki/Power_line_communication>.
"Secure Media and Goal Technology Solutions Embrace "Broadband Over Powerlines" to Distribute Secure Digital Entertainment", The Digital TV Consultancy, 2 pages; Retrieved: Nov. 11, 2009. <http://www.digitaltvnews.net/content/?p=5030>.
Hou, et al., "Distribution of digital TV signals over home power line networks", IEEE, published Apr. 6-8, 2005, 1 page. <http://ieeexplore.ieee.org/xpl/freeabs_all.jsp?arnumber=1430541>.

* cited by examiner

CHANNEL CHANGE VIA AN ALTERNATE MULTIMEDIA CONTENT DELIVERY SYSTEM

FIELD OF THE DISCLOSURE

The present disclosure is generally related to a channel change via an alternate multimedia content delivery system.

BACKGROUND

Television viewers often change the channel they are viewing. In some television systems, such as an Internet Protocol Television (IPTV) system, completing a channel change may involve initiating a transmission of media content (e.g., audio and video content) associated with the new channel. Thus, changing channels may increase a total amount of bandwidth consumed by the user. Because available bandwidth is limited, a channel change may not be available or may not be desirable due to bandwidth limitations. When a channel change request fails due to system bandwidth limitations, users may be frustrated (e.g., by viewing a blank television screen).

DETAILED DESCRIPTION

Systems and methods of delivering content in response to channel change requests are disclosed. In certain situations (e.g., low bandwidth conditions), a channel change may be completing by using an alternate system (e.g., a powerline or wireless network) instead of a primary system (e.g., IPTV network). A user may be notified of the low bandwidth condition and may be given the option to choose between multiple available alternate systems to complete the channel change.

In a particular embodiment, a method includes detecting a request to perform a channel change at a customer premise equipment (CPE) device. The method also includes sending the request to a server of a primary multimedia content delivery system that supports delivery of content to the CPE device. The method further includes receiving a bandwidth limitation message from the server. The method includes generating a notification for display at a display device coupled to the CPE device. The notification prompts a user with respect to delivery of content over one or more alternate multimedia content delivery systems in response to the requested channel change.

In another particular embodiment, a server is disclosed that includes a processor, a network interface, and a notification module coupled to the network interface and executable by the processor. The notification module is executable to receive a request to respond to a channel change request from a customer premise equipment (CPE) device. The notification module is also executable to determine that a bandwidth condition affects a completion of the channel change requested by the CPE device using a primary network. The notification module is further executable to send a notification via the network interface for display at a display device coupled to the CPE device. The notification prompts a user with respect to delivery of content over at least one alternate multimedia content delivery system in response to the requested channel change.

In another particular embodiment, a computer-readable storage medium is disclosed. The computer-readable storage medium includes operational instructions executable by the processor. The instructions cause the processor to receive a request to perform a channel change at a customer premise equipment (CPE) device. The instructions also cause the processor to determine that a bandwidth condition affects a completion of the channel change requested by the CPE device via a primary network. The instructions further cause the processor to automatically send a request for access to an alternate multimedia content delivery system to the server of a primary multimedia content delivery system. The instructions cause the processor to receive content from the alternate multimedia content delivery system via a multicast stream.

Figure 1:
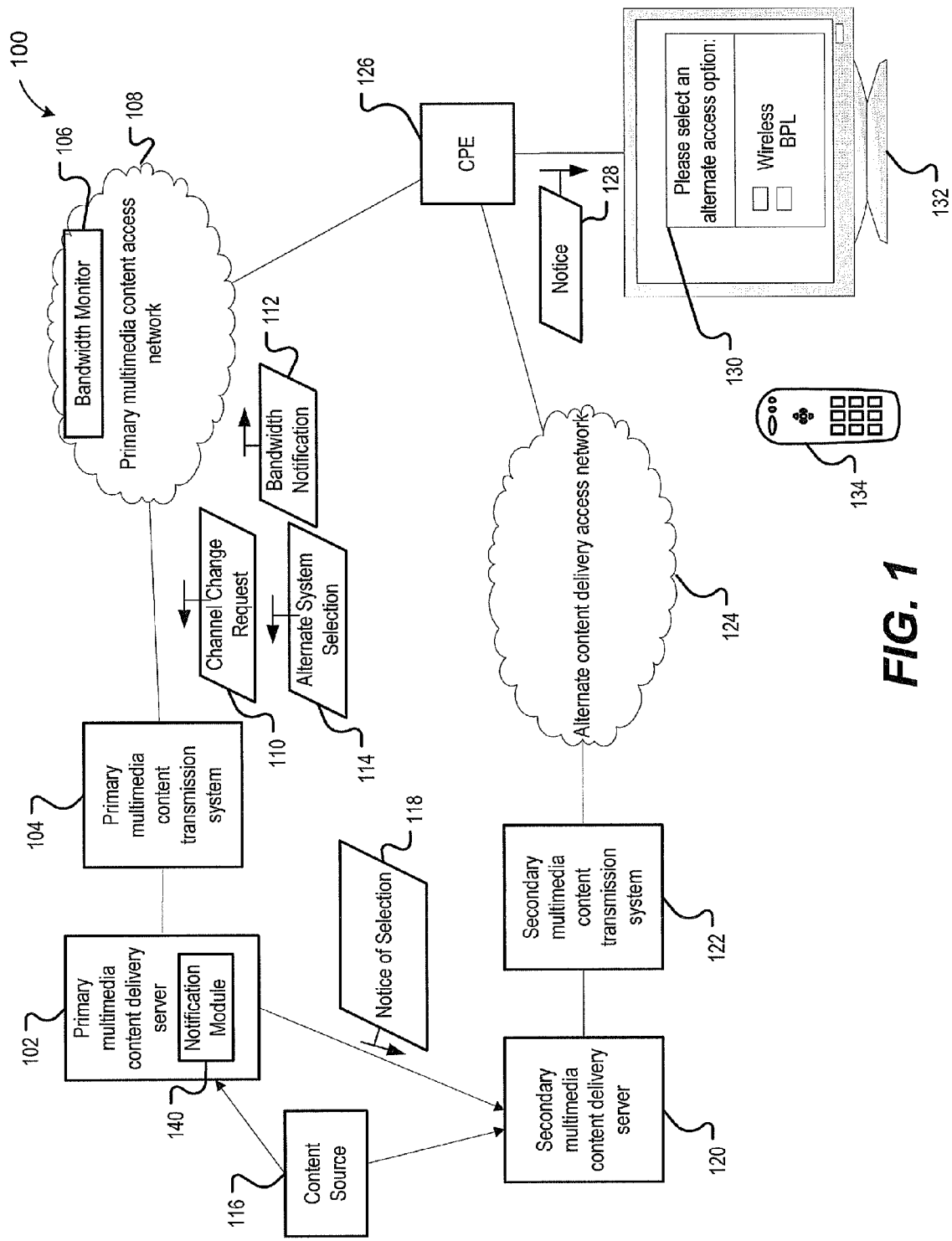
FIG. 1 is a block diagram of a first particular embodiment of a system for completing a channel change request via an alternate multimedia content delivery system.

Referring to FIG. 1, a particular illustrative embodiment of a communication system 100 is shown. The system 100 includes a primary multimedia content delivery server 102, a primary multimedia content transmission system 104, and a primary multimedia content access network 108. The system 100 further includes a content source 116 coupled to provide content to the primary multimedia content delivery server 102. The primary multimedia content access network 108 is coupled to one or more customer premise equipment (CPE) devices, such as the illustrated CPE device 126. The system 100 further includes a secondary multimedia content delivery server 120, a secondary multimedia content transmission system 122, and an alternate content delivery access network 124. The alternate content delivery access network 124 is also coupled to one or more CPE devices, such as the representative CPE device 126. The CPE device 126 is coupled to a display device 132. Generally, the system 100 may enable completion of channel change requests via alternate access networks.

The alternate content delivery access network 124 may be a similar type of network as the primary multimedia content access network 108 or may be a different type of network. In a particular illustrative embodiment, the alternate content delivery access network 124 is a broadband over power line (BPL) network or a wireless network, such as a wireless data network or cellular network. Thus, the alternate content delivery access network 124 may be an overlay or redundant network with respect to the primary multimedia content access network 108. The alternate content delivery access network 124 may also be a different type of network to provide additional redundancy and backup support for the primary multimedia content access network 108.

The secondary multimedia content transmission system 122 may be one of a variety of different types of transmission systems, such as a BPL network, a wireless network, or other types of data communication systems that may be used to deliver multimedia content. In a particular embodiment, the secondary multimedia content delivery server 120 is implemented as a computer server that is suitable to receive content from the content source 116 and includes interfaces to communicate with the secondary multimedia content transmission system 122. Typical interfaces may include wireless or wired electrical interconnects or other interfaces for use with communication protocols.

The primary multimedia content delivery server 102 may be a computer server with software instructions embedded therein to perform one or more of the functions described herein. In a particular illustrative embodiment, the primary multimedia content delivery server 102 includes a processor and a network interface. The network interface is responsive to the processor and is coupled to the primary multimedia content transmission system 104, or a particular element thereof. The primary multimedia content delivery server 102 includes a notification module 140. The notification module 140 is coupled to the network interface and is executable by the processor to perform various functions described herein.

In the communication system 100, a variety of services may be deployed by a service provider to a subscriber. For example, paid services including voice, video, and data services may be provided by a particular service provider via the network components illustrated. The network service provider may offer such services to multiple subscribers or to each subscriber via a CPE device, such as the illustrated CPE device 126 shown in FIG. 1.

During operation, content from the content source 116 is provided to the primary multimedia content delivery server 102. The content received at the primary multimedia content delivery server 102 is forwarded by the primary multimedia content transmission system 104 over the primary multimedia content access network 108 to a destination customer premises device, such as the CPE device 126. Examples of content from the content source 116 that may be communicated over the primary multimedia content access network 108 include video, audio, text, and other media content. An example of a type of network that may be used as the primary multimedia content access network 108 includes a satellite network, an internet protocol television (IPTV) network, a computer network, or a cable access television (CATV) network.

A user of the CPE device 126 may request an action, such as a channel change via an illustrative channel change request 110. In a particular embodiment, the communication system 100 includes a television content delivery system having multiple channels so that a user of the CPE device 126 may request a different channel. For example, a user of the CPE device 126 may request a channel change by using a particular button on a remote control device 134, such as a "channel up" button or a "channel down" button. Alternatively, the user may enter a particular channel identifier using a keypad (e.g., an alphanumeric keypad) of the remote control device 134. The remote control device 134 may wirelessly communicate with the CPE device 126.

In response to such requests by a user to change a channel, the CPE device 126 may communicate the channel change request 110 over the primary multimedia content access network 108. The channel change request 110 may be directed to the primary multimedia content transmission system 104 and ultimately directed to the destination primary multimedia content delivery server 102. The channel change request 110 is illustrated as a data message that is communicated from the CPE device 126 or from intermediate components between the CPE device 126 to the primary multimedia content delivery server 102. Upon receipt of the channel change request 110, the notification module 140 within the primary multimedia content delivery server 102 detects the channel change request 110 and processes such request.

In response to processing the channel change request 110, the notification module 140 also evaluates additional information or data related to the performance of the primary multimedia content access network 108. For example, a bandwidth monitor 106 within or accessible to the primary multimedia content access network 108 may evaluate bandwidth conditions with respect to a data communication link to the CPE device 126. The bandwidth monitor 106 may report the measured bandwidth conditions, and such monitored results may be communicated to the primary multimedia content delivery server 102. Thus, the notification module 140 may receive bandwidth data measured by the bandwidth monitor 106 with respect to the communication link to the CPE device 126.

In the event that the notification module 140 evaluates the bandwidth data from the bandwidth monitor 106 and determines that a channel change requested by a user of the CPE device 126 may not be accommodated, the notification module 140 may initiate further actions. For example, the channel change operation may not be accommodated because bandwidth at the communication link between the primary multimedia content access network 108 and the CPE device 126 may be overly limited or restricted. Due to the bandwidth limitation or restriction, a new channel or additional content may not be effectively communicated over the link to the CPE device 126. In this event, the notification module 140 may formulate a bandwidth notification message 112 and the bandwidth notification message 112 may be communicated over the primary multimedia content access network 108 to the destination CPE device 126.

Upon receipt of the bandwidth notification message 112, the CPE device 126 may communicate a notice message 128 to the display device 132. The display device 132, in response to receiving the notice message 128, displays a notification 130 of the bandwidth limited situation at the display device 132. An example of a notification 130 is illustrated. The notification 130 enables a user of the CPE device 126 to select an alternate content delivery access network 124 for delivery of the requested content. An example of requested content would be television or other video content available over a different channel. Thus, a user that requests content from a different channel may request delivery of the content over the alternate content delivery access network 124 when bandwidth conditions restrict delivery over the primary multimedia content access network 108. As an example, when bandwidth limitations limit (e.g., by delaying or reducing audio or quality) or otherwise prevent content delivery between the primary multimedia content access network 108 and the CPE device 126, a user may request an alternate network such as the alternate content delivery access network 124 to be activated or enabled to provide supplemental content for the channel requested. The supplemental content for the channel requested may be delivered over the alternate content delivery access network 124 to the CPE device 126.

In a particular illustrative embodiment, the user receives a prompt that identifies one or more alternate access network types. For example, the prompt of the notification 130 indicates a wireless network and a broadband powerline (BPL) network available as alternate content delivery networks. The user, in response to the notification 130, may select either the wireless network or the BPL network as supplemental secondary access. Alternatively, a user may receive a prompt that identifies a default network as a secondary access network, or the display device 132 may not indicate any particular type of access network. In such situations, a user may send a request for delivery or for non-delivery (e.g., the user may elect to wait until the necessary bandwidth at the primary network becomes available) over the alternate network. In another particular embodiment, the user may avoid seeing repeated notifications by selecting an option at the CPE device 126 that enables channel change requests to automatically be completed via an available alternate access network without notification.

Upon viewing of the notification 130 by the user, the user may select one of the identified access network types. For example, a user of the display device 132 may select a wireless network or the BPL network as shown. Upon receipt of a user selection of an alternate access network, the CPE device 126 communicates an alternate system selection message 114 based on the particular alternate access network selected by the user. Thus, the alternate system selection message 114 identifies either a wireless network or a BPL network in the particular example illustrated. The alternate system selection message 114 is forwarded via the primary multimedia content access network 108 and via the primary multimedia content transmission system 104 to the primary multimedia content delivery server 102.

Upon receipt of the alternate system selection message 114, the primary multimedia content delivery server 102 sends a notice of selection message 118 to the secondary multimedia content delivery server 120. For example, the notice of selection message 118 might identify either the wireless network or the BPL network for deployment with respect to the CPE device 126.

The secondary multimedia content delivery server 120 receives the notice of selection 118. Upon receipt of the notice of selection 118, the secondary multimedia content delivery server 120 sends control signals or commands or other configuration options as necessary to activate the secondary multimedia content transmission system 122 for deployment of content to be delivered to the CPE device 126. After activation or other initiation, configuration, or enablement, the secondary multimedia content transmission system 122, responsive to content received from the content source 116 at the secondary multimedia content delivery server 120, is operable and configured to deploy supplemental content via the alternate content delivery access network 124 to the destination CPE device 126.

In a particular example, where a user of the CPE device 126 is currently viewing a particular channel, such as channel 4, the user of the CPE device 126 may activate a channel change operation using the remote control device 134 (e.g., the user selects the "channel up" button to change to channel 5). In response to activating a channel change operation the user may receive the notification 130. Upon the user selecting one of the offered secondary network types, such as either a selection of a wireless network or a BPL network as shown, the CPE device 126 is configured to respond to content delivered over the alternate content delivery access network 124.

For example, when the user selects the wireless option in response to the notification 130, a wireless interface of the CPE device 126 may be activated or otherwise notified to expect content from the alternate content delivery access network 124. Thus, while infrastructure supporting the alternate content delivery access network 124 (e.g., the secondary multimedia content delivery server 120 and the secondary multimedia content transmission system 122) retrieves supplemental content for the selected channel (e.g., channel 5 selected by the user by selecting the "channel up" button). The CPE device 126 may concurrently initiate circuitry or interfaces to be ready to receive such content over the alternate content delivery access network 124. Thus, upon the user responding to the notification 130, channel content from the content source 116 may be deployed, distributed, and provided in substantially real time over the alternate content delivery access network 124 to the CPE device 126. Upon receipt of the content from the alternate content delivery access network 124, the CPE device 126 renders such content on the display 132.

In a particular embodiment, the notification module 140 within the primary multimedia content delivery server 102 is executable by the processor therein to perform functions including receiving the channel change request 110 to perform a channel change. The notification module 140 is also executable by the processor to determine that a bandwidth condition prevents a completion of the channel change requested by the CPE device 126. For example, the notification module 140 may access or otherwise receive data from the bandwidth monitor 106 to evaluate a bandwidth condition. The data from the bandwidth monitor 106 coupled with other data (e.g., data associated with other CPE devices) available to the primary multimedia content delivery server 102, may indicate a bandwidth condition that is limited or otherwise restricted in a manner that would prevent completion of the channel change request 110.

In response to the notification module 140 determining that the bandwidth condition prevents completion of the channel change requested by the CPE device 126, the notification module 140 is executable by the processor to send a bandwidth notification 112 via network interface of the primary multimedia content delivery server 102. The bandwidth notification 112 may be displayed at the display device 132 coupled to the CPE device 126. The bandwidth notification 112 may be suitable to prompt a user to select at least one alternate multimedia content delivery system for use in delivering the requested multimedia content. For example, the notification module 140 may send the bandwidth notification message 112, which in turn may trigger the CPE device 126 to send the notice message 128 to the display device 132. The display device 132 displays the notification 130 that includes at least one alternate access network that may be selected by a user.

In a particular embodiment, the bandwidth notification message 112 indicates that an available bandwidth capacity at a digital subscriber line associated with the CPE device 126 and a server, such as the primary multimedia content delivery server server 102, is less than a threshold bandwidth. The threshold bandwidth may represent a capacity suitable for accommodating transmission of content over a channel corresponding to the requested channel change. In a particular embodiment, a fee may be associated with use of the alternate content delivery access network 124. In this event, the notice 128 and the corresponding notification 130 may identify the fee that is associated with at least one alternate multimedia content delivery system. The fees may be charged as a lump sum (e.g., $2.00) per content item or as a function of access time (e.g., $0.99 cents per hour). Furthermore, fees for different alternate access networks may be different. For example, a fee for alternate access via a BPL network may be greater than a fee for alternate access via a wireless network.

For example, the notification 130 displayed at the display device 132 may indicate a fee associated with delivering content over the alternate content delivery access network 124 and a prompt to enable a user to accept the fee. The primary multimedia content delivery server 102 may include a delivery module that is executable by the processor to receive a response indicating an acceptance of the fee associated with a selected alternate multimedia content delivery system. In response to receiving the response accepting the fee, the delivery module within the primary multimedia content delivery server 102 may deliver multimedia data corresponding to the channel change via the selected alternate multimedia content delivery system.

Instead of sourcing the requested content from the primary multimedia content delivery server 102, the primary multimedia content delivery server 102 may send the notice of selection message 118 to the secondary multimedia content delivery server 120. In this scenario, the secondary multimedia content delivery server 120 may retrieve the content responsive to the channel change request 110 from the content source 116. The secondary multimedia content server 120 may then source the requested content responsive to the channel change request independently of any content stored or previously accessed by the primary multimedia content delivery server 102. Thus, the secondary multimedia content delivery server 120 may be an independent system and may be maintained by a different service provider than the primary multimedia content delivery server 102. For example, the secondary multimedia content delivery server 120 may be associated with a wireless network offered by a second service provider while the primary multimedia content delivery server 102 is associated with a broadband network offered by a first service provider (e.g., television, cable, satellite, or other television service provider). Alternatively, the primary multimedia content access network provider may be a triple play service provider that offers video, voice, and data services. For example, the primary multimedia content delivery server 102 may be a head-end or a component within a service provider head-end.

In a particular embodiment, when the secondary multimedia content delivery server 120 is maintained by a different service provider than the primary multimedia content delivery server 102, the notice of selection 118 includes identification information associated with the CPE device 126. For example, the secondary multimedia content delivery server 120 may be a municipal powerline server coupled to a municipal power grid and the primary multimedia content delivery server 102 may be an IPTV server. The IPTV server may transmit content to the CPE device 126 via an Internet protocol (IP) address of the CPE device. However, the municipal powerline server may not be capable of reaching the CPE device 126 via IP communication. In such a scenario, the notice of selection 118 may include a home address associated with the CPE device 126, thereby enabling the municipal powerline server to send the requested multimedia content to the CPE device 126 (e.g., the municipal powerline server may send the requested multimedia content to all electrical outlets at the home address).

Thus, the system 100 of FIG. 1 may notify a user of a reason why a requested channel change cannot be completed via a primary network. Furthermore, the system 100 of FIG. 1 may provide the user with an option to complete the channel change via a secondary network. The system 100 of FIG. 1 may also enable service providers to generate revenue by charging a fee for access via the alternate network.

Figure 2:
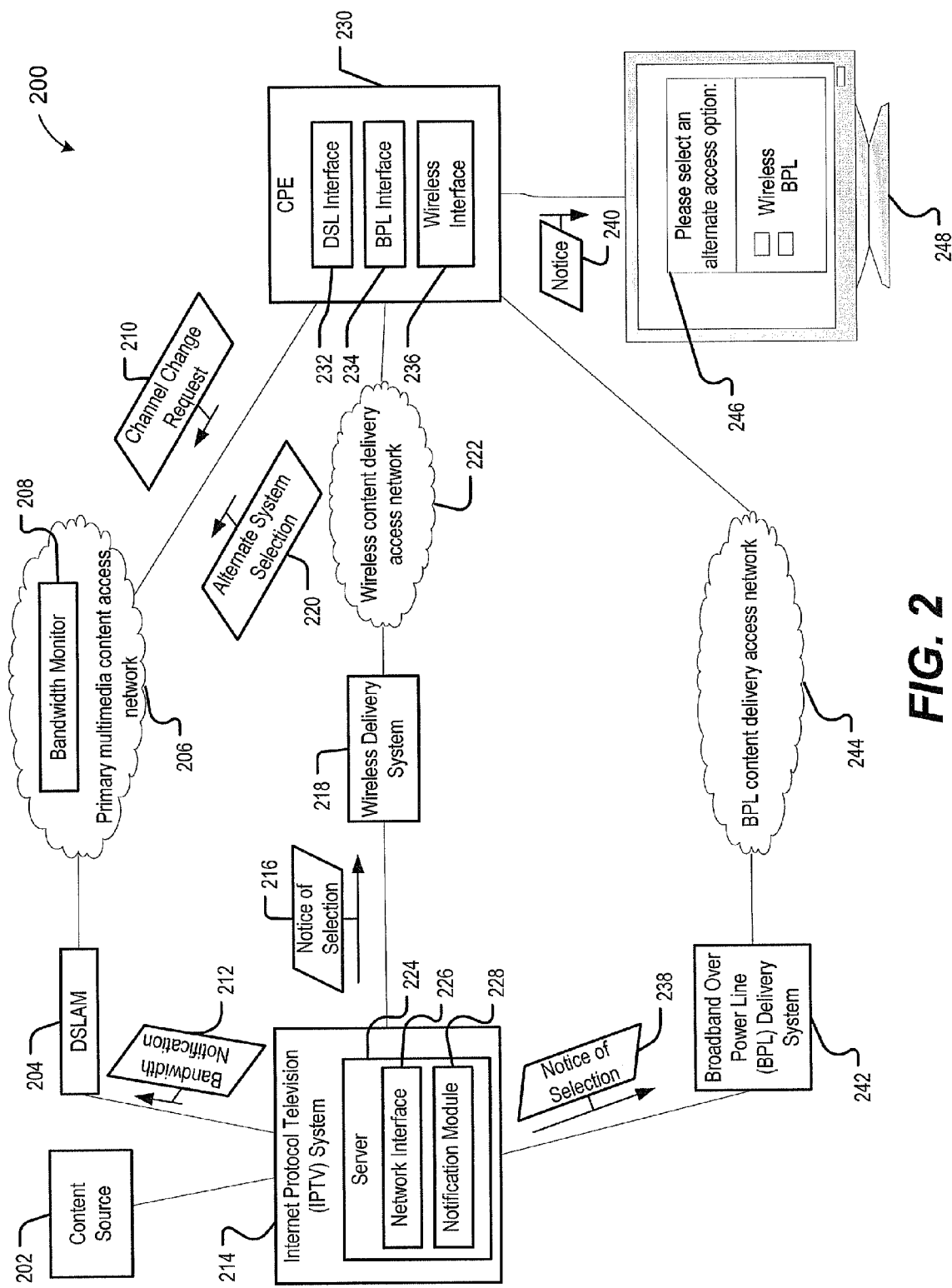
FIG. 2 is a block diagram of a second particular embodiment of a system to respond to a channel change request via an alternate multimedia content delivery system.

Referring to FIG. 2, a communication system 200 is depicted for completing a channel change request via an alternate multimedia content delivery system. The system 200 includes a display device 248, a CPE device 230, a content source 202, and an IPTV system 214. The IPTV system 214 may include a server 224 with a notification module 228 and a network interface 226 configured to communicate via a primary multimedia content access network 206, a wireless content delivery access network 222, a BPL content delivery access network 244, or any combination thereof. In an illustrative embodiment, the CPE device 230 is the CPE device 126 of FIG. 1 and the primary multimedia content access network 206 is the primary multimedia content access network 108 of FIG. 1. The wireless content delivery access network 222 and the BPL content delivery access network 244 may be examples of the alternate content delivery access network 124 of FIG. 1.

The system 200 includes a primary multimedia content delivery system that includes a digital subscriber line (DSL) access multiplexor (DSLAM) 204 and a primary multimedia content access network 206. The system 200 further includes a wireless delivery system 218 (e.g., coupled to the wireless content delivery access network 222) to provide wireless delivery of multimedia content to the CPE device 230. The system 200 also includes a BPL delivery system 242 (e.g., coupled to the BPL content delivery access network 244) to deliver multimedia content to the CPE device 230 via a power line.

The CPE device 230 includes a DSL interface 232 for receiving multimedia content via the primary multimedia content access network 206. The CPE device 230 further includes a wireless interface 236 for receiving multimedia content via the wireless content delivery access network 222. The CPE device 230 also includes a BPL interface 234 for receiving multimedia content via the BPL content delivery access network 244.

During operation, a channel change request 210 may be issued from the CPE device 230 via the DSL interface 232. The channel change request 210 may be issued in response to a channel change request from a user of the CPE device 230. The channel change request 210 may be transmitted to the IPTV system 214 via the primary multimedia content access network 206 and the DSLAM 204. Upon receipt of the channel change request 210, the IPTV system 214, via a notification module 228, may determine whether sufficient bandwidth exists to complete the channel change request 210. The notification module 228 may be communicatively coupled to the primary multimedia content access network 206 and may access a bandwidth monitor 208 to determine a current bandwidth condition over a digital subscriber line terminating at the CPE device 230. In the event that sufficient bandwidth does not exist to complete the channel change request 210, the notification module 228 may issue a bandwidth notification 212.

The bandwidth notification 212 may be communicated to the CPE device 230 via the DSLAM 204 and the primary multimedia content access network 206. The CPE device 230 may communicate the bandwidth notification 212 in the form of a notice 240 directed to the display device 248. In response to the notice 240, the display device 248 may present a notification 246 that identifies alternate access options available to the user. Upon selection of an alternate access option, an alternate system selection 220 may be transmitted from the CPE device 230 via the primary multimedia content access network 206 and the DSLAM 204 to the IPTV system 214.

The notification module 228 within the server 224 of the IPTV system 214 may issue a notice of selection to the selected alternate access system. For example, when a user selects to receive multimedia content via a wireless delivery system 218, a notice of selection 216 may be sent to the wireless delivery system 218 and the wireless content delivery access network 222, such that multimedia content will be delivered to the CPE device 230 via the wireless delivery system 218 and the wireless content delivery access network 222. Similarly, when a user selects to receive multimedia content via the BPL delivery system 242, a notice of selection 238 may be communicated to the BPL delivery system 242 and the BPL content delivery access network 244, such that multimedia content is delivered to the CPE device 230 via the BPL delivery system 242 and the BPL content delivery access network 244.

It will be appreciated that the system 200 of FIG. 2 may provide users with multiple alternate access options, including third-party access options. For example, the wireless delivery system 218 may be operated by the same service provider as the DSLAM 204 and the BPL delivery system 242 may be operated by a different service provider. In such a scenario, a user may specify the wireless delivery system 218 as a default alternate delivery system and may elect to use the third party BPL delivery system 242 as a backup when the wireless delivery system 218 is offline.

Figure 3:
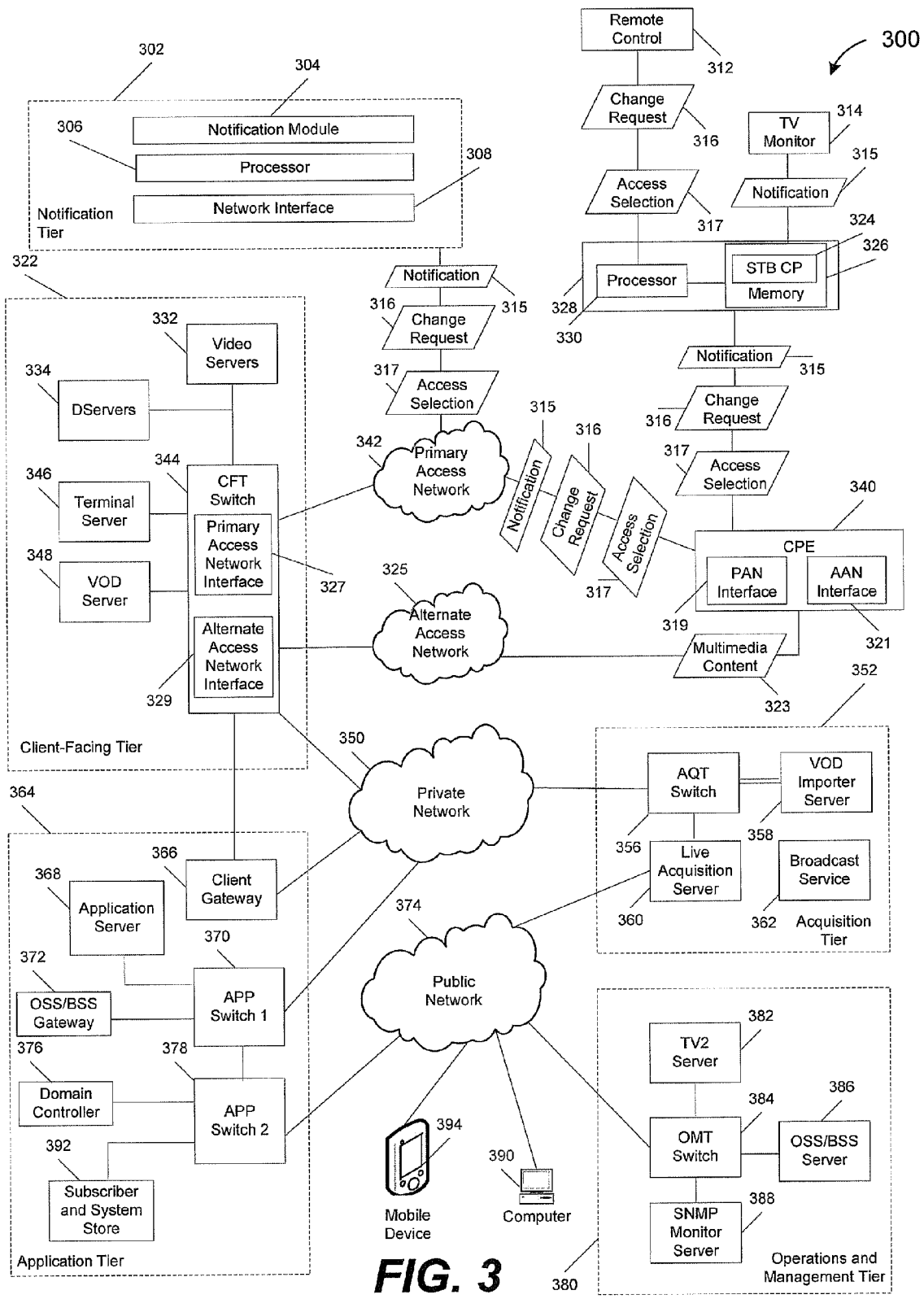
FIG. 3 is a block diagram of a third particular embodiment of a system to respond to a channel change request via an alternate multimedia content delivery system.

Referring to FIG. 3, an embodiment of a system to complete a channel change request via an alternate multimedia content delivery system is illustrated and generally designated 300. In the embodiment of FIG. 3, completing a channel change request via an alternate multimedia content delivery system is carried out using an Internet Protocol Television (IPTV) system. The embodiment of FIG. 3 is included only for illustrative purposes. In alternative embodiments, the television system can be a cable television system, a satellite television system, or another type of television system. Further, the embodiment of FIG. 3 describes only one possible implementation of an IPTV television service.

As shown, the system 300 can include a notification tier 302, a client facing tier 322, an application tier 364, an acquisition tier 352, and an operations and management tier 380. Each tier 302, 322, 352, 364, and 380 can be coupled to a private network 350; to a public network 374, such as the Internet; to a primary access network 342; to an alternate access network 325; or to more than one of the private network 350, the public network 374, the primary access network 342, and the alternate access network 325. For example, the client-facing tier 322 can be coupled to the private network 350, the primary access network 342, and the alternate access network 325. The notification tier 302 can be coupled to the primary access network 342. Further, the application tier 364 can be coupled to the private network 350 and to the public network 374. The acquisition tier 352 can also be coupled to the private network 350 and to the public network 374. Additionally, the operations and management tier 380 can be coupled to the public network 374. In an illustrative embodiment, the primary access network 342 is the primary multimedia content access network 108 of FIG. 1 or the primary multimedia content access network 206 of FIG. 2, and the alternate access network 325 is the alternate content delivery access network 124 of FIG. 1, the wireless content delivery access network 222 of FIG. 2, or the BPL content delivery access network 244 of FIG. 2.

As illustrated in FIG. 3, the various tiers 302, 322, 352, 364, and 380 may communicate with each other via the private network 350, the public network 374, the primary access network 342, and the alternate access network 325. For instance, the client-facing tier 322 can communicate with the application tier 364 and the acquisition tier 352 via the private network 350. The notification tier 302 can communicate with the client facing tier 322 via the primary access network 342. The application tier 364 can communicate with the acquisition tier 352 via the private network 350. Further, the application tier 364 can communicate with the acquisition tier 352 and the operations and management tier 380 via the public network 374. Moreover, the acquisition tier 352 can communicate with the operations and management tier 380 via the public network 374. In a particular embodiment, elements of the application tier 364, including but not limited to a client gateway 366, can communicate directly with the client-facing tier 322.

The client-facing tier 322 may communicate with user equipment via the primary access network 342, such as an IPTV access network. In addition, the client-facing tier 322 may communicate with user equipment via the alternate access network 325, such a wireless access network or a BPL access network. In an illustrative embodiment, the CPE 340 can be coupled to a local switch, router, or other device of the primary access network 342. Likewise, the CPE 340 can be coupled to a local switch, router, or other device of the alternate access network 325. The CPE 340 may communicate with the primary access network 342 via a primary access network (PAN) interface 319 at the CPE 340. Similarly, the CPE 340 may communicate with the alternate access network 325 via an alternate access network (AAN) interface 321 at the CPE 340.

The client-facing tier 322 can communicate with a representative set-top box device 328 at a customer premise via the CPE 340. The CPE 340 can include routers, local area network devices, modems, such as digital subscriber line (DSL) modems, any other suitable devices for facilitating communication between a set-top box device and the primary access network 342, the alternate access network 325, or any combination thereof.

In a particular embodiment, the client-facing tier 322 can be coupled to the CPE 340 via fiber optic cables. Alternatively, the CPE 340 can include DSL modems that are coupled to one or more network nodes via twisted pairs, and the client-facing tier 322 can be coupled to the network nodes via fiber-optic cables. The set-top box device 328 can process data received via the access network 342, via an IPTV software platform.

The set-top box device 328 can be coupled to an external display device, such as a television monitor 314. Moreover, the set-top box device 328 can communicate with a remote control 312 to receive user input. The set-top box device 328 can include IPTV set-top box devices as well as video gaming devices or consoles that are adapted to receive IPTV content. The set-top box device 328 can also include personal computers or other computing devices that are adapted to emulate set-top box device functionalities and any other device adapted to receive IPTV content and transmit data to an IPTV system via an access network.

In an exemplary, non-limiting embodiment, the set-top box device 328 can receive data, video, or any combination thereof, from the client-facing tier 322 via the CPE 340 and access networks 342, 325 and render or display the data, video, or any combination thereof, at the TV monitor 314 to which it is coupled. In an illustrative embodiment, the set-top box device 328 can include tuners that receive and decode television programming signals or packet streams for transmission of content to the TV monitor 314. Further, the set-top box device 328 can include a STB processor 330 and a STB memory device 326 that is accessible to the STB processor 330. In one embodiment, a computer program, such as the STB computer program 324, can be embedded within the STB memory device 326. In another illustrative embodiment, a user computing device, such as a personal computer, laptop or local server, can be coupled to the set-top box device 328, for example, via a universal serial bus (USB) connection or other connection.

In an illustrative embodiment, the client-facing tier 322 can include a client-facing tier (CFT) switch 344 that manages communication between the client-facing tier 322 and the access network 342 and between the client-facing tier 322 and the private network 350. As illustrated, the CFT switch 344 is coupled to one or more data servers, such as D-servers 334, that store, format, encode, replicate, or otherwise manipulate or prepare video content for communication from the client-facing tier 322 to the set-top box device 328. The CFT switch 344 can also be coupled to a terminal server 346 that provides terminal devices with a connection point to the private network 350. In a particular embodiment, the CFT switch 344 can be coupled to a video-on-demand (VOD) server 348 that stores or provides VOD content imported by the IPTV system 300.

Further, the CFT switch 344 is coupled to one or more video servers 332 that receive video content and transmit the content to the set-top box 328 via the access networks 342, 325 and the CPE 340. In a particular embodiment, the CFT switch 344 can be coupled to one or more publication servers that facilitate the formation of groups that share private content and the inclusion of indicators of such private content with video content received by users in a group.

In an illustrative embodiment, the client-facing tier 322 can communicate with a large number of set-top boxes, such as the representative set-top box 328 via the CPE 340 over a wide geographic area, such as a regional area, a metropolitan area, a viewing area, a designated market area or any other suitable geographic area, market area, or subscriber or customer group that can be supported by networking the client-facing tier 322 to numerous set-top box devices. In a particular embodiment, the CFT switch 344, or any portion thereof, can include a multicast router or switch that feeds one or more video streams from a video server to multiple set-top box devices.

As illustrated in FIG. 3, the application tier 364 can communicate with both the private network 350 and the public network 374. The application tier 364 can include a first application tier (APP) switch 370 and a second APP switch 378. In a particular embodiment, the first APP switch 370 can be coupled to the second APP switch 378. The first APP switch 370 can be coupled to an application server 368 and to an OSS/BSS gateway 372. In a particular embodiment, the application server 368 can provide applications to the set-top box device 328 via the access networks 342, 325, which enable the set-top box device 328 to provide functions, such as display, messaging, processing of IPTV data and VOD material, etc. In a particular embodiment, the OSS/BSS gateway 372 includes operation systems and support (OSS) data, as well as billing systems and support (BSS) data. In one embodiment, the OSS/BSS gateway 372 can provide or restrict access to an OSS/BSS server 386 that stores operations and billing systems data.

The second APP switch 378 can be coupled to a domain controller 376 that provides Internet access, for example, to users at their computer 390 or mobile device 394 via the public network 374. For example, the domain controller 376 can provide remote Internet access to IPTV account information, e-mail, personalized Internet services, or other online services via the public network 374. In addition, the second APP switch 378 can be coupled to a subscriber and system store 392 that includes account information, such as account information that is associated with users who access the IPTV system 300. In an illustrative embodiment, the subscriber and system store 392 can store subscriber or customer data and create subscriber or customer profiles that are associated with IP addresses of corresponding set-top box device 328.

In a particular embodiment, the application tier 364 can include a client gateway 366 that communicates data directly to the client-facing tier 322. The client gateway 366 may be coupled directly to the CFT switch 344. The client gateway 366 can provide user access to the private network 350 and the tiers coupled thereto. In an illustrative embodiment, the CPE 340 can access the IPTV system 300 via the access networks 342, 325 using information received from the client gateway 366. User devices can access the client gateway 366 via the access networks 342, 325 and the client gateway 366 can allow such devices to access the private network 350 once the devices are authenticated or verified. Similarly, the client gateway 366 can prevent unauthorized devices, such as hacker computers or stolen set-top box devices from accessing the private network 350, by denying access to these devices beyond the access networks 342, 325.

For example, when the representative set-top box device 328 accesses the client-facing tier 322 via the primary access network 342, the client gateway 366 can verify subscriber information by communicating with the subscriber and system store 392 via the private network 350. Further, the client gateway 366 can verify billing information and status by communicating with the OSS/BSS gateway 372 via the private network 350. In one embodiment, the OSS/BSS gateway 372 can transmit a query via the public network 374 to the OSS/BSS server 386. After the client gateway 366 confirms subscriber and/or billing information, the client gateway 366 can allow the set-top box device 328 to access IPTV content and VOD content at the client-facing tier 322. If the client gateway 366 cannot verify subscriber information for the set-top box device 328, e.g., because it is connected to an unauthorized twisted pair, the client gateway 366 can block transmissions to and from the set-top box device 328 beyond the access network 342.

As indicated in FIG. 3, the acquisition tier 352 can include an acquisition tier (AQT) switch 356 that communicates with the private network 350. The AQT switch 356 can also communicate with the operations and management tier 380 via the public network 374. In a particular embodiment, the AQT switch 356 can be coupled to a live acquisition server 360 that receives or acquires television content, movie content, advertisement content, other video content, or any combination thereof, from a broadcast service 362, such as a satellite acquisition system or satellite head-end office. In a particular embodiment, the live acquisition server 352 can transmit content to the AQT switch 356, and the AQT switch 356 can transmit the content to the CFT switch 344 via the private network 350.

In an illustrative embodiment, content can be transmitted to the D-servers 334, where it can be encoded, formatted, stored, replicated, or otherwise manipulated and prepared for communication from the video server(s) 332 to the set-top box device 328 via the CPE 340. The CFT switch 344 may include a primary access network interface 327 coupled to the primary access network 342. The CFT switch 344 may also include an alternate access network interface 329 coupled to the alternate access network 325. The CFT switch 344 can receive content from the video server(s) 332 and communicate the content to the CPE 340 via the access network 342. The set-top box device 328 can receive the content via the CPE 340, and can transmit the content to the TV monitor 314. In an illustrative embodiment, video or audio portions of the content can be streamed to the set-top box device 328.

Further, the AQT switch 356 can be coupled to a video-on-demand importer server 358 that receives and stores television or movie content received at the acquisition tier 352 and communicates the stored content to the VOD server 346 at the client-facing tier 322 via the private network 350. Additionally, at the acquisition tier 352, the video-on-demand (VOD) importer server 358 can receive content from one or more VOD sources outside the IPTV system 300, such as movie studios and programmers of non-live content. The VOD importer server 358 can transmit the VOD content to the AQT switch 356, and the AQT switch 356, in turn, can communicate the material to the CFT switch 344 via the private network 350. The VOD content can be stored at one or more servers, such as the VOD server 348.

When users issue requests for VOD content via the set-top box device 328, the requests can be transmitted over the access networks 342, 325 to the VOD server 348, via the CFT switch 344. Upon receiving such requests, the VOD server 348 can retrieve the requested VOD content and transmit the content to the set-top box device 328 across the access networks 342, 325 via the CFT switch 344. The set-top box device 328 can transmit the VOD content to the TV monitor 314. In an illustrative embodiment, video or audio portions of VOD content can be streamed to the set-top box device 328.

FIG. 3 further illustrates that the operations and management tier 380 can include an operations and management tier (OMT) switch 384 that conducts communication between the operations and management tier 380 and the public network 374. In the embodiment illustrated by FIG. 3, the OMT switch 384 is coupled to a TV2 server 382. Additionally, the OMT switch 384 can be coupled to an OSS/BSS server 386 and to a simple network management protocol (SNMP) monitor 388 that monitors network devices within or coupled to the IPTV system 300. In a particular embodiment, the OMT switch 384 can communicate with the AQT switch 356 via the public network 374.

In an illustrative embodiment, the live acquisition server 330 can transmit content to the AQT switch 356, and the AQT switch 356, in turn, can transmit the content to the OMT switch 384 via the public network 374. In this embodiment, the OMT switch 384 can transmit the content to the TV2 server 382 for display to users accessing the user interface at the TV2 server 382. For example, a user can access the TV2 server 382 using a personal computer (PC) 390 coupled to the public network 374.

The notification tier 302 may include a notification module 304, a processor, and a network interface 308 coupled to the primary access network 342. In an illustrative embodiment, the notification module operates as described with reference to the notification module 140 of FIG. 1 and the notification module 228 of FIG. 2.

When a user of the STB 328 changes a channel (e.g., via the remote control 312), a change request 316 may be transmitted to the STB 328. The STB 328 may transmit the change request 316 to the CPE 340, and the CPE 340 may transmit the change request 316 to the notification tier 302. The notification tier 302 may determine that insufficient bandwidth exists at the primary access network 342 to complete the requested channel change. A notification 315 regarding the insufficient bandwidth condition may be transmitted to the STB 328 via the primary access network 342 and the CPE 340. The STB 328 may display the notification 315 at the TV monitor 314.

In response to the notification 315, the user may make an access selection 317 (e.g., via the remote control 312). For example, the access selection 317 may indicate that the user desires to complete the channel change request via the alternate access network 325. The access selection 317 may be transmitted to the notification module 304. In response to the access selection 317, the channel change may be completed using the alternate access network 325. For example, multimedia content 323 associated with the new channel may be transmitted to the CPE 340 via the alternate access network 325.

Figure 4:
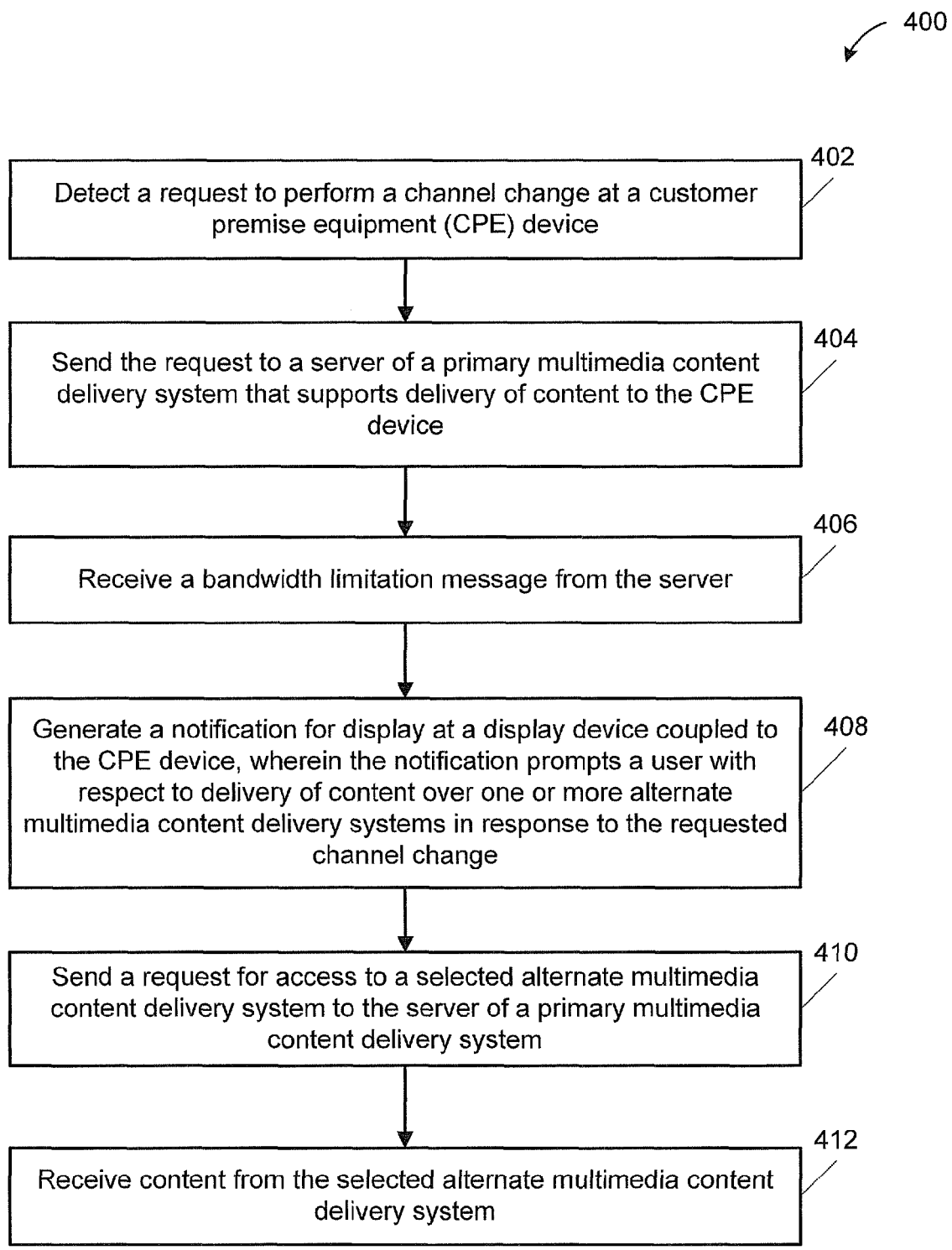
FIG. 4 is a flow diagram of a first particular embodiment of a method to complete a channel change request via an alternate multimedia content delivery system.

Referring to FIG. 4, a particular illustrative embodiment of a method 400 of responding to channel change request is shown. The method includes detecting a request to perform a channel change at a customer premise device, at 402. For example, referring to FIG. 1, a channel change request 110 may be communicated via the primary multimedia content transmission system 104 to the primary multimedia content delivery server 102.

The method further includes sending the request to a server of a primary multimedia content delivery system that supports delivery of content to the CPE device, at 404. For example, in FIG. 1, the channel change request 110 may be delivered to the notification module 140 within the primary multimedia content delivery server 102.

The method further includes receiving a bandwidth limitation message from the server, at 406. For example, in FIG. 1, the primary multimedia content access network 108 or the CPE device 126 may receive the bandwidth message 112.

The method further includes generating a notification for display at a display device coupled to the CPE device, at 408. The notification prompts a user with respect to delivery of content over one or more alternate multimedia content delivery systems in response to the requested channel change, at 408. For example, in FIG. 1, the notification 130 may be displayed at the display device 132 coupled to the CPE device 126.

The method further includes sending a request for access to a selected alternate multimedia content delivery system to the server of a primary multimedia content delivery system, at 410. For example, in FIG. 1, the notice of selection 118 may be sent from the primary multimedia content delivery server 102 to the second multimedia content delivery server 120. The notice of selection 118 functions as a request for access to the selected alternate multimedia content system. The selected alternate multimedia content delivery system may be a wireless network or a broadband over power line network that is coupled or otherwise accessible to the secondary multimedia content delivery server 120.

The method further includes receiving content from the selected alternate multimedia content delivery system, at 412. For example, in FIG. 1, the CPE device 126 may receive content over the selected channel requested where the content is delivered over the selected alternate content delivery access network 124. As a further example, when the CPE device 126 requests a wireless alternate network, the content of the requested channel is delivered over a wireless network 124 to the CPE device 126. Alternatively, when the CPE device 126 requests content over a secondary broadband over power line network, the alternate content delivery access network 124 is a bandwidth over power line network that delivers the requested content for the new channel or change channel to the CPE device 126.

It should be understood that while only a single alternate content delivery access network 124 is shown in FIG. 1, many alternate content delivery access networks may be deployed and operated in parallel and a single content delivery access network 124 is shown for simplicity of illustration in FIG. 1. In one example, the CPE device 126 is a set top box device (STB), residential gateway, a network router, or other network equipment that may be used by a subscriber or user of a data communication device within a residence or office environment.

For example, the CPE device 126 may be a residential gateway having multiple interfaces including a first interface to the primary multimedia content delivery system 108, a second interface to a first alternate multimedia content delivery system 124, and a third interface to a second alternate multimedia content delivery system 124. For simplicity of illustration, the alternate content delivery access network 124 has been shown as a single network. However, the multiple alternate multimedia content delivery systems may be used such as the first alternate multimedia content delivery system (e.g., wireless) and a second alternate multimedia content delivery system (e.g., broadband over power line). As an example, a first alternate content delivery access network is a wireless content delivery access network 222 and a second alternate multimedia content delivery system is represented by the broadband over power line content delivery access network 244 in FIG. 2. In a particular embodiment, the method further includes sending a request for access to a selected alternate multimedia content delivery system (e.g., wireless or BPL) to one or more servers of a primary multimedia content delivery system, and the method further includes receiving content from the selected alternate multimedia content delivery system. The content received includes multimedia content corresponding to the requested channel change.

Figure 5:
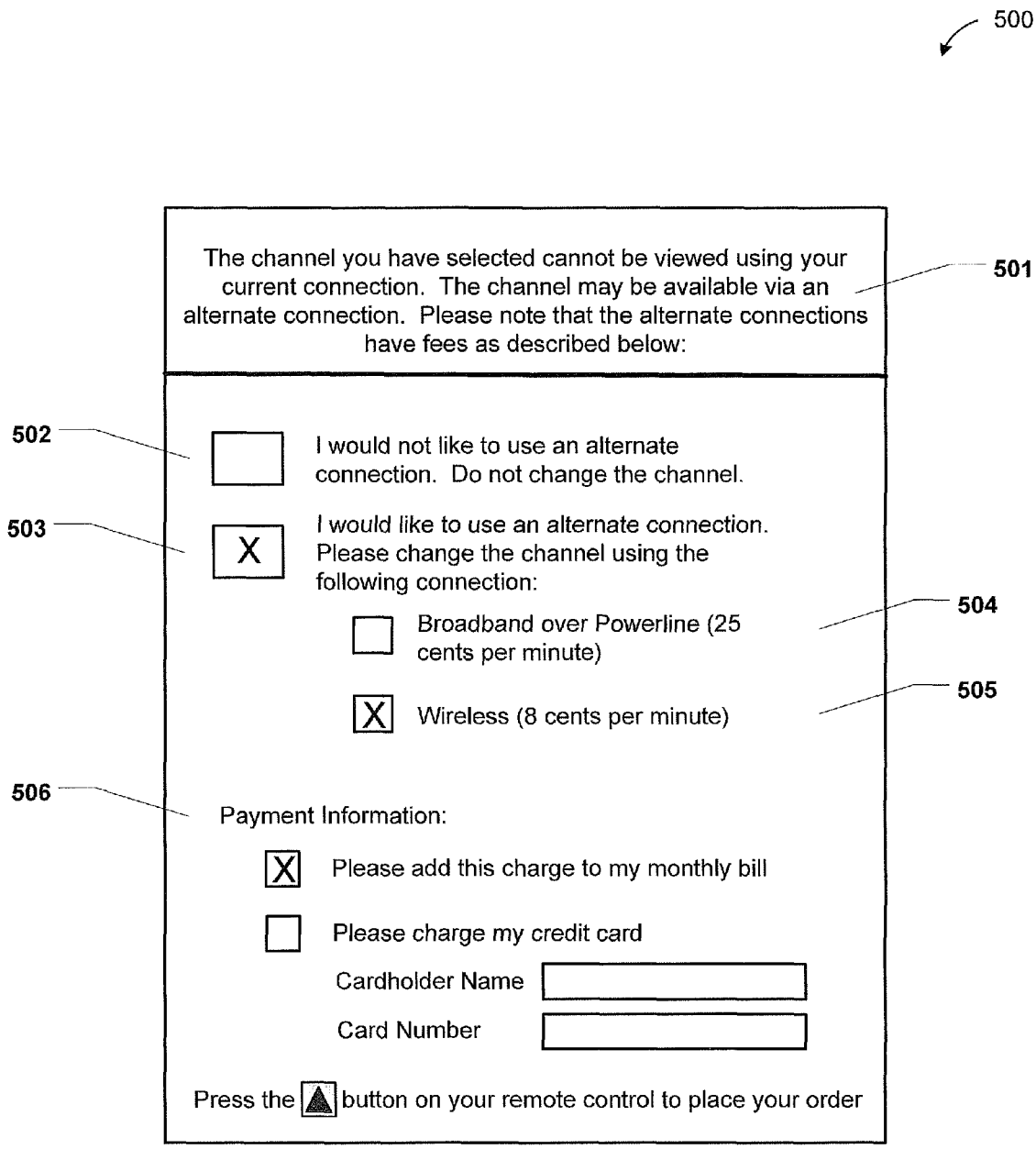
FIG. 5 is depicts a particular embodiment of a graphical user interface (GUI) to select an alternate multimedia content delivery system to respond to a channel change request.

FIG. 5 depicts a particular embodiment of a graphical user interface (GUI) 500 to select an alternate multimedia content delivery system to complete a channel change request. In an illustrative embodiment, the GUI 500 displays the notification 130 of FIG. 1, the notification 246 of FIG. 2, or the notification 315 of FIG. 3. In an illustrative embodiment, the GUI 500 is displayed at a display device such as the display device 130 of FIG. 1, the display device 248 of FIG. 2, or the TV monitor 314 of FIG. 3.

The GUI 500 may include a notification message 501 indicating that a channel change request cannot be completed. In a particular embodiment, the notification message 501 also includes a reason that the channel change request cannot be completed. For example, the notification message 501 may also include a low bandwidth indication. The notification message 501 may optionally include statistics (e.g., a maximum available bandwidth, a current bandwidth usage, and a bandwidth required to complete the channel change) associated with the low bandwidth indication.

The GUI 500 may also include one or more alternate connection options. For example, the GUI 500 may include a first option 502 to cancel the channel change request and a second option 503 to complete the channel change via an alternate connection. The GUI 500 may also include a list of available alternate connections, such as a BPL connection option 504 and a wireless connection option 505.

In a particular embodiment, fees associated with the alternate connection options 504, 505 are also displayed at the GUI 500. When alternate connection options are subject to a fee, the GUI 500 may include a payment information section 506. In the particular embodiment illustrated in FIG. 5, a fee of 25 cents per minute is associated with the BPL connection option 504 and a fee of 8 cents per minute is associated with the wireless connection option 505. For example, the payment information section 506 may provide a user with the ability to automatically add the charge for the alternate connection to a monthly service bill or to enter payment information (e.g., credit/debit card information) at the GUI 500. In a particular embodiment, when a user selects an alternate connection option at the GUI 500, the selected alternate connection option becomes a default alternate connection option. For example, when a subsequent channel change request is not accommodated by a primary connection option, a service provider may automatically attempt to complete the channel change request via the default alternate connection option.

It will be appreciated that the GUI 500 of FIG. 5 may provide users with information regarding why a previously requested channel change has not been completed, instead of showing the users a blank screen. It will also be appreciated that the GUI 500 of FIG. 5 may inform users of available alternate connections and fees and may enable users to determine how to pay the fees.

Figure 6:
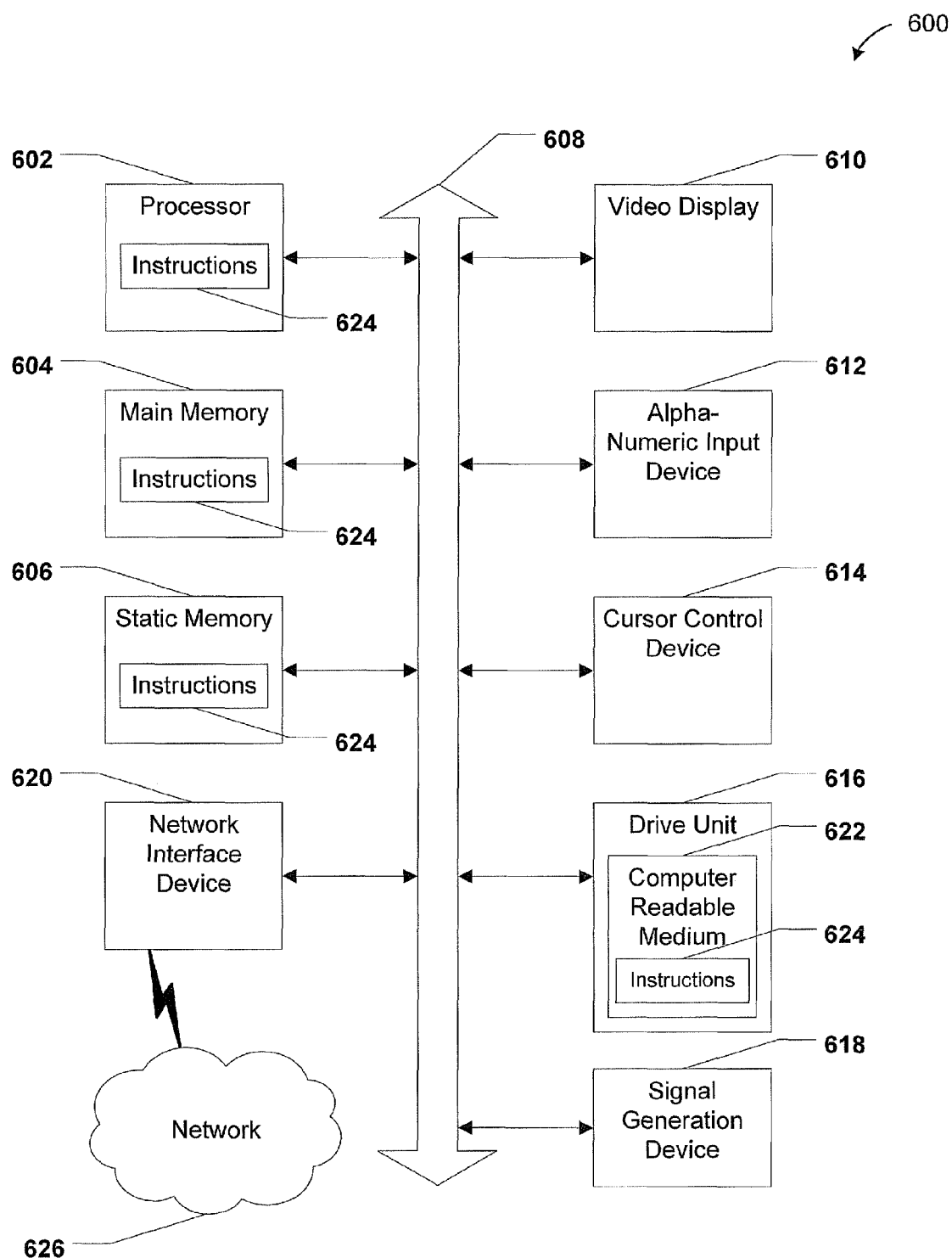
FIG. 6 is a block diagram of an illustrative embodiment of a general computer system.

Referring to FIG. 6, an illustrative embodiment of a general computer system is shown and is designated 600. The computer system 600 can include a set of instructions that can be executed to cause the computer system 600 to perform any one or more of the methods or computer based functions disclosed herein. The computer system 600 may operate as a standalone device or may be connected, e.g., using a network, to other computer systems or peripheral devices.

In a networked deployment, the computer system 600 may operate in the capacity of a server or as a client user computer in a server-client user network environment, or as a peer computer system in a peer-to-peer (or distributed) network environment. The computer system 600 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a web appliance, or any other machine capable of executing a set of instructions (sequential or otherwise) that specify actions to be taken by that machine. In a particular embodiment, the computer system 600 may be implemented using electronic devices that provide video, audio, or data communication. Further, while a single computer system 600 is illustrated, the term "system" shall also be taken to include any collection of systems or sub-systems that individually or jointly execute a set, or multiple sets, of instructions to perform one or more computer functions. In an illustrative embodiment, the computer system 600 may include one or more of the CPE device 126 of FIG. 1, the systems 104, 122 of FIG. 1, the servers 102, 120 of FIG. 1, the CPE device 230 of FIG. 2, the systems 218, 242 of FIG. 2, and the server 214 of FIG. 2. Each of the CPE device 126 of FIG. 1, the systems 104, 122 of FIG. 1, the servers 102, 120 of FIG. 1, the CPE device 230 of FIG. 2, the systems 218, 242 of FIG. 2, and the server 214 of FIG. 2 may include or be implemented using the computer system 600 or a portion thereof.

As illustrated in FIG. 6, the computer system 600 may include a processor 602, e.g., a central processing unit (CPU), a graphics processing unit (GPU), or both. Moreover, the computer system 600 may include a main memory 604 and a static memory 606, which can communicate with each other via a bus 608. As shown, the computer system 600 may further include a video display unit 610, such as a liquid crystal display (LCD), a projection television system, a flat panel display, or a solid state display. Additionally, the computer system 600 may include an input device 612, such as a keyboard, and a cursor control device 614, such as a mouse. The computer system 600 may also include a disk drive unit 616, a signal generation device 618, such as a speaker or remote control, and one or more network interface devices 620 capable of communicating with a network 626. Not all of the components of the computer system 600 of FIG. 6 may be included. For example, some computer systems 600 may not include an input device (e.g., a server may not include an input device).

In a particular embodiment, as depicted in FIG. 6, the disk drive unit 616 may include a computer-readable storage medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 624, the static memory 606, and/or within the processor 602 during execution by the computer system 600. The main memory 604 and the processor 602 also may include computer-readable media.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionality as described herein.

The present disclosure contemplates a computer-readable storage medium that stores instructions 624. While the computer-readable storage medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or operations disclosed herein.

In a particular non-limiting, exemplary embodiment, the computer-readable storage medium may include a solid-state memory such as a memory card or other package that houses one or more non-volatile read-only memories. Further, the computer-readable storage medium may be a random access memory or other volatile re-writable memory. Additionally, the computer-readable storage medium may include a magneto-optical or optical medium, such as a disk or tapes or other storage device. A digital file attachment to an e-mail or other self-contained information archive or set of archives may be considered equivalent to a tangible storage medium. Accordingly, the disclosure is considered to include any one or more of a computer-readable storage medium and other equivalents and successor media, in which data or instructions may be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
sending, to a first server of a primary multimedia content delivery system associated with a primary multimedia content access network, a request to perform a channel change at a customer premise equipment device, wherein the customer premise equipment device includes a first network interface to the primary multimedia content access network;
receiving a bandwidth shortage message from the first server after sending the request to the first server, the bandwidth shortage message indicating a shortage of available bandwidth between the first server and the customer premise equipment device via which to complete the request;

generating a notification for display at a display device coupled to the customer premise equipment device in response to receiving the bandwidth shortage message, wherein the notification includes a prompt to select an alternate transmission option associated with delivery of content via an alternate multimedia content delivery system, wherein the alternate transmission option identifies the alternate multimedia content delivery system configured to deliver the content;

sending, from the customer premise equipment device, an access request to receive the content from a second server of the alternate multimedia content delivery system via an alternate multimedia content access network, wherein the access request is sent in response to selection of the alternate transmission option; and receiving, at the customer premise equipment device, the content from the second server, wherein the customer premise equipment device comprises a second network interface configured to interface with the alternate multimedia content access network, and wherein the first network interface is distinct from the second network interface.

2. The method of claim 1, wherein the customer premise equipment device is responsive to input received from a remote control device to select a particular alternate transmission option associated with a set of alternate multimedia content delivery systems.

3. The method of claim 1, wherein the alternate transmission option includes a wireless option, a broadband over power line option, or a combination thereof, wherein the wireless option is associated with a wireless network, and wherein the broadband over power line option is associated with a broadband over power line network.

4. The method of claim 1, wherein the primary multimedia content delivery system is an internet protocol television system.

5. The method of claim 1, wherein the customer premise equipment device includes a media playback device, a residential gateway device, or a combination thereof.

6. The method of claim 1, wherein the primary multimedia content delivery system is distinct from the alternate multimedia content delivery system, and wherein the primary multimedia content access network is distinct from the alternate multimedia content access network.

7. The method of claim 1, further comprising sending a notice of selection of the alternate transmission option to the second server via the first server.

8. The method of claim 1, wherein the access request is sent to the first server of the primary multimedia content delivery system.

9. The method of claim 8, wherein the content includes multimedia content corresponding to the channel change.

10. The method of claim 1, wherein the primary multimedia content delivery system includes a cable television system and wherein the first server includes a cable television system video head end.

11. A server comprising:
a processor;
a network interface; and
a memory comprising instructions that, when executed by the processor, cause the processor to perform operations comprising:

receiving a request, from a customer premise equipment device via a primary multimedia content delivery system associated with a primary multimedia content access network, to perform a channel change associated with the customer premise equipment device, wherein the customer premise equipment device includes a first network interface to the primary multimedia content access network;

determining whether a bandwidth shortage condition is present, the bandwidth shortage condition indicating a shortage of available bandwidth between the server and the customer premise equipment device to complete the channel change requested by the customer premise equipment device;

sending a notification, via the network interface, to the customer premise equipment device in response to a determination that the bandwidth shortage condition is present, wherein the notification includes a prompt to select an alternate transmission option associated with delivery of content via an alternate multimedia content delivery system, wherein the alternate transmission option identifies the alternate multimedia content delivery system configured to deliver the content;

receiving, from the customer premise equipment device, an access request indicating selection of the alternate transmission option, the access request associated with receiving the content from an alternate server of the alternate multimedia content delivery system via an alternate multimedia content access network; and instructing the alternate server to send the content to the customer premise equipment device via the alternate multimedia content access network, wherein the customer premise equipment device comprises a second network interface configured to interface with the alternate multimedia content access network, and wherein the first network interface is distinct from the second network interface.

12. The server of claim 11, wherein the notification indicates that an available bandwidth capacity at a digital subscriber line between the customer premise equipment device and the server via a digital subscriber line access multiplexer is smaller than a threshold bandwidth capacity of a channel corresponding to the channel change requested.

13. The server of claim 11, wherein instructing the alternate multimedia content delivery system includes sending a second indication of the selection to the alternate server of the alternate multimedia content delivery system, and wherein the alternate multimedia content delivery system includes a broadband over power line system, a wireless system, or a combination thereof.

14. The server of claim 11, wherein the notification indicates a first fee associated with using the alternate multimedia content delivery system and a second fee associated with using a second alternate multimedia content delivery system.

15. The server of claim 14, wherein the access request indicates acceptance of the first fee.

16. A computer-readable storage device storing instructions that, when executed by a processor, cause the processor to perform operations comprising:

receiving a request, from a customer premise equipment device, to perform a channel change associated with the customer premise equipment device, wherein the customer premise equipment device includes a first network interface to a primary multimedia content access network;

determining whether a bandwidth shortage condition is present, the bandwidth shortage condition indicating a shortage of bandwidth between a first server of a primary multimedia content delivery system and the customer premise equipment device via which to complete the channel change requested by the customer premise equipment device;

determining whether to send a notification to the customer premise equipment device based on an option selected via the customer premise equipment device, wherein the notification includes a prompt to select an alternate transmission option associated with delivery of content via an alternate multimedia content delivery system, wherein the alternate transmission option identifies the alternate multimedia content delivery system configured to deliver the content;

receiving, from the customer premise equipment device, an access request indicating selection of the alternate transmission option, the access request associated with receiving the content from a second server of the alternate multimedia content delivery system via an alternate multimedia content access network; and instructing the second server to send the content to the customer premise equipment device via the alternate multimedia content access network, wherein the customer premise equipment device comprises a second network interface configured to interface with the alternate multimedia content access network, and wherein the first network interface is distinct from the second network interface.

17. The computer-readable storage device of claim 16, wherein determining whether to send the notification is further based on a determination that the bandwidth shortage condition is present.

18. The method of claim 1, wherein the primary multimedia content delivery system is associated with a first service provider, and wherein the alternate multimedia content delivery system is associated with a second service provider distinct from the first service provider.

19. The server of claim 11, wherein the alternate multimedia content delivery system comprises a plurality of alternate multimedia content delivery systems, and wherein the notification indicates a corresponding fee for each of the plurality of alternate multimedia content delivery systems.

20. The method of claim 1, wherein the alternate transmission option includes a second alternate multimedia content delivery system, wherein the alternate multimedia content delivery system is distinct from the second alternate multimedia content delivery system, and wherein the customer premise equipment device includes a third interface to a second alternate multimedia content access network coupled to the second alternate multimedia content delivery system.

\* \* \* \* \*